Nov. 21, 1950 W. DARLING 2,531,199

RELAY SATELLITE BROADCAST SYSTEM

Filed March 25, 1947

INVENTOR.
Woodrow Darling
BY H. G. Grover
ATTORNEY

Patented Nov. 21, 1950

2,531,199

UNITED STATES PATENT OFFICE 2,531,199

RELAY SATELLITE BROADCAST SYSTEM

Woodrow Darling, Merchantville, N. J., assignor to Radio Corporation of America, a corporation of Delaware Application March 25, 1947, Serial No. 737,031

4 Claims. (Cl. 250—6)

Figure 1:
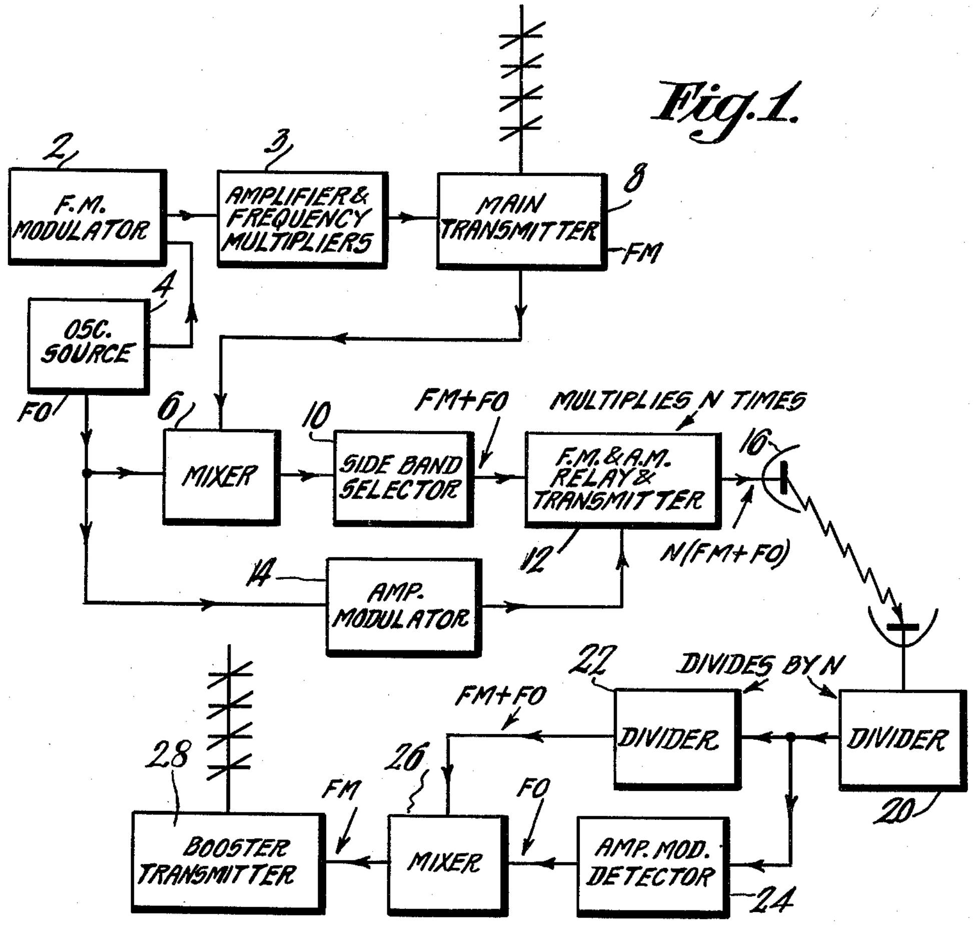

This application discloses an improved broadcasting system and has as its main object provision of a simplified satellite broadcast system wherein the main station is connected to the auxiliary or booster station by a radio relay. The booster or satellite station is arranged to cover an area not well serviced by the main station and both transmitting stations operate on the same frequency.

Heretofore, separate transmitting systems have been used in the main station and at the satellite or booster station with a common audio supply for separate modulator circuits at the separate transmitter. In other words, in these systems, two substantially complete exciters and transmitters are used with the audio or modulation circuits being the only circuits common to both stations.

A more detailed object of my invention is to provide essentially a single transmitter system which produces the signal to be broadcast at the main station and also the signal to be relayed to the secondary broadcast or satellite station. Furthermore, the relayed signal is to be locked in by the broadcast signal at the main station and is used as excitation for the transmitter at the secondary station so that in effect, the two signals which are broadcast are locked in synchronism each with the other.

In systems of this nature, the FCC, of course, assigns the main broadcast transmitter frequency of operation and also a band of frequencies wherein the relaying is to take place.

A further object of my invention is to provide a simplified satellite system wherein although the broadcast frequency is fixed, the frequency at which relaying may be carried out is readily changeable in small steps to suit the conditions at hand.

Briefly, these objects are attained in accordance with my invention by using, if at hand, or providing, if not at hand, a frequency modulated carrier such as commonly used for exciting, through multipliers, transmitters which may be in existence or may be provided. Carrier energy is diverted from the exciter and modulated signal from the main transmitter, operating at a multiplied frequency, and mixed. The sum side band is selected and multiplied to the frequency at which relaying is to take place and transmitted, by radiation. In the embodiment being described, wave length modulation of the carrier is carried out. The wave length modulation may have the characteristics of phase or frequency modulation or both. Prior to relaying, by radiation, the frequency multiplied frequency modulated carrier is modulated in amplitude by the exciter carrier. The amplitude modulation may be small, say 10% to 20% which will be sufficient for selection of the exciter carrier at the satellite or booster station. At the booster station, the received relayed signal is divided down and detected to derive the amplitude modulation which represents the exciter carrier. This carrier is then mixed with the main signal after it is further divided, if necessary, and the frequency modulated difference frequency taken for the booster transmitter. The frequencies involved are selected so that the booster transmitter frequency and the main transmitter frequency are the same and as assigned for use at the station.

There has been some tendency to go to higher frequencies for radio relaying. This creates difficulties in the use of conventional tubes and circuits.

A further object of the present invention is to provide a simplified satellite system wherein the relaying takes place at frequencies low enough to be efficiently handled by tubes of the lighthouse type. Then a system arranged in accordance with my invention may be used without design difficulties.

Figure 2:
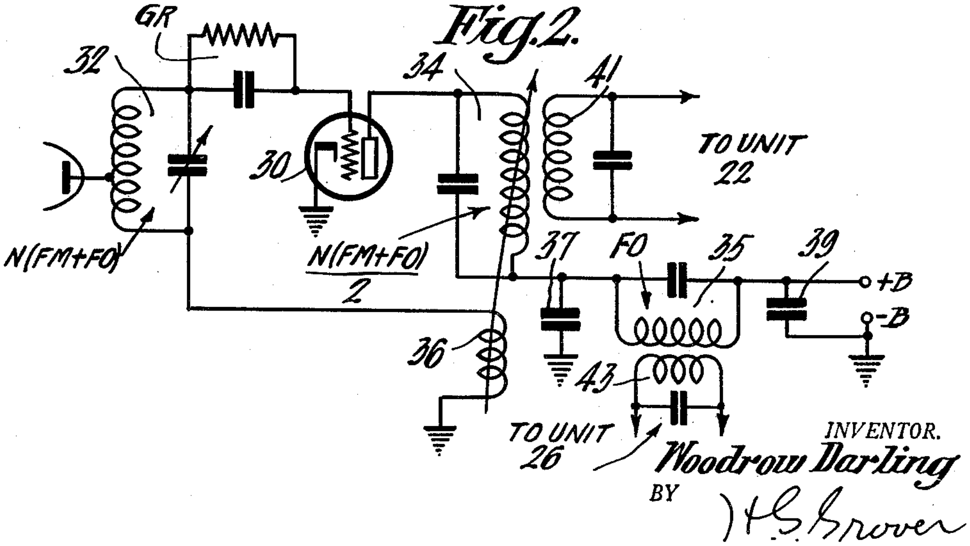

In describing my invention in detail, reference will be made to the attached drawings wherein Fig. 1 illustrates a relay satellite broadcast system arranged in accordance with my invention, while Fig. 2 illustrates one form of rectifier and frequency divider which may be used in the frequency dividing circuits of my system.

In Fig. 1, 2 is a wavelength modulation system using the term as defined above. In the description which follows, the same has been referred to as a frequency modulation system. It may be of various types such as, for example, a corrected phase modulation system with multipliers or a direct frequency modulation system or it may be a frequency modulation system of the type using a frequency modulated oscillator, and a fixed oscillator with means for selecting for use a beat frequency resulting from mixing the modulated oscillations and the oscillations of fixed frequency. At 4, I have shown a source of oscillations of fixed frequency which may be as supplied as carrier energy to the apparatus in 2 including the modulation source and modulator. The frequency modulated output is supplied to amplifiers and frequency multipliers in unit 3 and then used to excite the main transmitter 8. The transmitter 8 includes the usual amplifiers. The modulated oscillations as increased in amplitude and frequency are broadcast.

The source 4 is of substantially fixed frequency and may comprise a stabilized wave generator with multipliers, for example, a crystal oscillator and if desired, multipliers. A source stabilized in frequency by automatic control means may also be used here. Oscillations from the source 4 are supplied to a mixer 6 and to an amplitude modulator 14. In the mixer 6, the oscillations of substantially fixed frequency are mixed with modulated oscillations from the main transmitter and a side band is selected by unit 10. The side band selector in 10 may comprise sharply tuned circuits and the output thereof, which is a frequency modulated wave, is supplied to a frequency modulated and amplitude modulated wave relay transmitter 12. The carrier wave from source 4 is also supplied to the amplitude modulator 14 and used thereby to modulate the amplitude of the frequency modulated wave supplied at 12. A small amount of amplitude modulation only is required here, for example, 10 to 20 per cent. The wave in 12 is multipled the desired amount to bring it up to the relay frequency band and the same is relayed by parabolic antenna 16. The relayed wave is intercepted and reduced in frequency in unit 20 by division. Two outputs are taken from the frequency divider in 20. One goes to further frequency dividers in 22 and the other is passed to an amplitude modulation detector in 24 wherein the modulation components resulting from amplitude modulation of the frequency modulated and multiplier carrier by the oscillations of fixed frequency from source 4 are demodulated and selected to be supplied to a mixer 26. The mixer 26 is also supplied with output from the divider 22. The frequency selected is such that a side band selected from the output of the mixer 26, is of the same frequency as the frequency modulated wave transmitted from the main transmitter at 8. This selected side band goes to the booster transmitter 28 which may comprise amplifiers as desired and is radiated to service an area not well reached by the transmitter 8.

In my schematic diagram, I have not shown the amplifiers as separate units. It will be understood, of course, that amplification takes place where needed and the amplifiers may be conventional. For example, the units 3 and 8, in addition to including the necessary frequency multipliers, will include the necessary amplifiers. The mixer in 6 may be a conventional simple demodulator. The selectors in unit 10 may be tuned circuits and may include amplifying stages if desired. This unit and/or the unit 12 may include the necessary frequency multipliers. The unit 12 may include a stage wherein modulation takes place in a conventional manner under control of the output of the amplitude modulator 14. The divider 20 at the satellite station may include or be preceded by an amplifier. Amplifiers may be included in unit 22 and in the output of the mixer 26 and in the unit 28.

Although I do not limit my system to the use of any particular frequencies for broadcasting or for relaying, examples of the frequencies which may be used, will be given. In selecting these frequencies, I have kept in mind frequencies which have been assigned by the FCC for frequency modulation broadcast channels and for relaying purposes. The source in 4 might have an output of 4.4 megacycles and the main transmitter 8 might operate at 88 megacycles. Then the unit 3 and/or 8 includes multipliers having a multiplication factor of 20. The upper side band might be selected from the output of 6 and then is 92.4 megacycles. Then the multipliers in 12 may have a multiplication factor of 10 and the dividers in units 20 and 22, a total factor of division equal to 10. This gives an input to the mixer 26 from the divider 22 of 92.4 megacycles so that the lower side band selected from the output at 26 is at 88 mc.

Although, in general, the broadcast frequency once assigned is not changed, sometimes permission to change the relay frequencies is obtainable and provision is made in my system for changing the same. For example, the output of oscillator 4 might be doubled in frequency in which case, the mixer 6 would have an output of 96.8 mc. and relaying radiation might take place at 968 mc. At the satellite station, the same process described hereinbefore would be used.

An advantage of my system is that the frequencies used are such that good efficiency can be obtained by use of known tubes, and an antenna of parabolic type works very well.

As to the transmission, there is no audio phase shift because the circuits used are sufficiently broad to treat all frequency modulation side bands uniformly so that they retain the original audio amplitude and phase in the booster transmitter. Other systems that use separate frequency controls at the separate transmitter, introduce audio phase shift and set up audio beats which permit passage of noise through the listener sets in certain areas of overlap of essentially equal signal strength. In my system, there will be no region wherein the signals will produce low frequency beats, because they are synchronized. Another advantage of my system resides in the elimination of frequency discriminators and other circuits of the like critical nature, wherein tuning and balance is difficult and wherein phase shift and dissimilarities may be produced. Moreover, in my system, remodulation of a carrier by the signal in the booster is not necessary.

As stated above, the frequency dividers in units 20 and 22 may be conventional and may be separate from the detector in unit 24. However, in Fig. 2, I have shown an improved frequency divider and rectifier for use at 20 in my system. Then the amplitude modulation detector in 24 is omitted and the divided output of unit 20 is fed to unit 22 and the rectified output of unit 20 is fed to the mixer 26. This divider is shown in Fig. 2 as being connected directly to a parabolic antenna, but it may be coupled thereto by amplifiers. The divider and rectifier comprises a discharge tube 30 with its grid connected to a parallel tuned circuit 32 tuned to the relayed signal frequency. The circuit includes a grid leak and condenser unit GR. The anode is coupled in a parallel circuit 34 tuned to one-half the frequency of circuit 32. The anode is also coupled with a second parallel circuit 35 tuned to the frequency $F_0$ of the carrier used to amplitude modulate the frequency modulated signal in the unit 12. The condenser 37 is a bypass for voltage of the divided frequency while the condenser 39 is a plate source bypass condenser. Output at the divided frequency may be taken by an inductance 41 coupled to the inductance of circuit 34. The rectified components of frequency $F_0$ appear across circuit 35 and may be fed by coupling inductance 43 to the mixer 26. Regeneration is used, being obtained by coupling inductance 36.

The time constant of the grid leak condenser combination is adjusted so that its time constant is long compared with 1000 mc. and short compared with 4.4 mc.

During operation, an excitation positive peak on the grid of tube 30 overcomes the negative bias and causes the tube to amplify to excite the plate circuit 34 to develop oscillations at a fraction of the excitation frequency. Feed back takes place at the divided frequency and when the voltages fed back and the original excitation voltages are positive at the same time the bias is overcome and the plate circuit is again excited to set up oscillations of the divided frequency. When the system is adjusted to divide by two, a positive excitation peak occurs when the feed back would be positive, and this starts oscillations in the circuit 34. The next positive excitation peak (peak number two) is ineffective because the feed back voltage is negative but the third positive peak is again effective since it occurs when the second positive peak of the divided frequency occurs. In other words, regeneration takes place on every other positive peak of the applied wave. Rectification takes place and the amplitude modulations of frequency $F_0$ are set up in circuit 35.

What is claimed is:

1. In a satellite broadcast system, a main transmitter, a secondary transmitter at a distance therefrom operating at the same frequency at which the main transmitter operates, a source of excitation for the main transmitter comprising a carrier modulator and a frequency multiplier and a source of excitation for said secondary transmitter which synchronizes it with said main transmitter comprising means for combining wave energy representing the multiplied modulated carrier with wave energy representing the carrier and for selecting a side band resulting from said combination, means for multiplying the frequency of the selected side band and modulating it in accordance with wave energy representing said carrier, means for relaying the resultant energy to said secondary transmitter, means for frequency dividing and detecting the relayed energy to derive wave energy representing said first mentioned carrier, and means for mixing said derived energy with the energy of divided frequency to obtain excitation energy for the secondary transmitter.

2. In a satellite broadcast system, a main transmitter, a secondary transmitter at a distance therefrom operating at the same frequency at which the main transmitter operates, a source of excitation for the main transmitter comprising a frequency modulator for a carrier and a frequency multiplier and a source of excitation for said secondary transmitter which synchronizes it with said main transmitter comprising means for combining wave energy representing the multiplied frequency modulated carrier with wave energy representing the carrier and for selecting a frequency modulated side band resulting from said combination, means for multiplying the frequency of the selected frequency modulated side band and modulating its amplitude in accordance with wave energy representing said carrier, means for relaying the resultant energy to said secondary transmitter, means for frequency dividing and detecting the amplitude modulated relayed energy to derive wave energy representing said first mentioned carrier, and means for mixing said derived energy with the energy of divided frequency to obtain excitation energy for the secondary transmitter.

3. In a satellite broadcast system, a main transmitter, a secondary transmitter at a distance therefrom operating at the frequency at which said main transmitter operates, means for exciting the main transmitter comprising a single substantially constant frequency source of carrier energy modulated in accordance with signals with frequency multiplying means coupling said source to said main transmitter, means for transmitting to said secondary transmitter oscillatory energy representing said carrier and multiplied modulated carrier, a mixer excited by said oscillatory energy and by oscillatory energy of the carrier frequency, and means for using a sideband frequency at the output of said mixer for exciting said secondary transmitter.

4. In a satellite broadcast system, a main transmitter, a secondary transmitter at a distance therefrom operating at the frequency at which said main transmitter operates, means for exciting the main transmitter comprising a single substantially constant frequency source of carrier energy modulated in accordance with signals with frequency multiplying means coupling said source to said main transmitter, and a source of excitation for the secondary transmitter comprising a mixer excited by carrier energy from said first-named source and by multiplied modulated carrier, a frequency multiplier coupled to the output of said mixer, a modulator for the multiplied mixer output energy, said modulator being excited by carrier energy from said first-named source, and means for relaying the modulated multiplied mixer output energy to said secondary transmitter.

WOODROW DARLING.

REFERENCES CITED

The following references are of record in the file of this patent:

UNITED STATES PATENTS

| Number | Name | Date |
|---|---|---|
| 1,754,881 | Clement | Apr. 15, 1930 |
| 2,094,113 | Affel | Sept. 28, 1937 |
| 2,127,015 | Tillyer | Aug. 16, 1938 |
| 2,140,730 | Batchelor | Dec. 20, 1938 |
| 2,186,130 | Wintringham | Jan. 9, 1940 |
| 2,248,797 | Waller | July 8, 1941 |
| 2,292,222 | Haigis | Aug. 4, 1942 |
| 2,397,913 | Bernstein | Apr. 9, 1946 |
| 2,399,469 | Cook | Apr. 30, 1946 |
| 2,421,727 | Thompson | June 3, 1947 |
| 2,458,124 | Wilmotte | Jan. 4, 1949 |

OTHER REFERENCES

FM and Television, December 1944, Co-Channel Synchronous FM Satellite, pages 18–21 and 75, by Phil B. Laeser.